United States Patent
Watarai (10) Patent No.: US 8,035,703 B2
(45) Date of Patent: Oct. 11, 2011

(54) DEVICE AND METHOD FOR MEASURING NOISE CHARACTERISTICS

(75) Inventor: Yuji Watarai, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 904 days.

(21) Appl. No.: 12/034,366

(22) Filed: Feb. 20, 2008

(65) Prior Publication Data

US 2008/0198244 A1     Aug. 21, 2008

(30) Foreign Application Priority Data

Feb. 20, 2007   (JP) .................................. 2007-039706

(51) Int. Cl.
*H04N 5/217*     (2006.01)
*H04N 5/00*      (2006.01)

(52) U.S. Cl. ........................................ 348/241; 348/607

(58) Field of Classification Search .................. 348/241, 348/607; 382/275
See application file for complete search history.

(56) References Cited

U.S. PATENT DOCUMENTS

| | | | |
|---|---|---|---|
| 4,761,819 | A | 8/1988 | Denison et al. |
| 6,804,393 | B2 | 10/2004 | Gindele et al. |
| 7,065,257 | B2 | 6/2006 | Soga et al. |
| 2002/0126911 | A1 | 9/2002 | Gindele et al. |
| 2003/0052979 | A1 | 3/2003 | Soga et al. |
| 2007/0206885 | A1 | 9/2007 | Wen |

FOREIGN PATENT DOCUMENTS

| | | |
|---|---|---|
| JP | 63-253481 A | 10/1988 |
| JP | 2001-136542 A | 5/2001 |
| JP | 2002-269558 A | 9/2002 |
| JP | 2003-085553 A | 3/2003 |
| JP | 2003-331283 A | 11/2003 |
| JP | 2005-303802 A | 10/2005 |

*Primary Examiner* — William Choi
(74) *Attorney, Agent, or Firm* — Arent Fox LLP

(57) ABSTRACT

A noise characteristics measurement device that facilitates the measurement of noise characteristics in an imaging sensor. The noise characteristics measurement device has a classification circuit including a plurality of pixel value regions obtained by dividing a numerical range that can be taken by pixel values of the imaging sensor in accordance with the level of a pixel value. The classification circuit classifies pixel values of the imaging sensor into the plurality of pixel value regions. A calculation circuit calculates a value representing a dispersion degree of the pixel values classified into each pixel value region.

8 Claims, 5 Drawing Sheets

Fig.3

| L1 | R | Gr | R | Gr | R | Gr | R | Gr | R | Gr | R | Gr | R |
| L2 | Gb | B | Gb | B | Gb | B | Gb | B | Gb | B | Gb | B | Gb |
| L3 | R | Gr | R | Gr | R | Gr | R | Gr | R | Gr | R | Gr | R |
| L4 | Gb | B | Gb | B | Gb | B | Gb | B | Gb | B | Gb | B | Gb |
| L5 | R | Gr | R | Gr | R | Gr | R | Gr | R | Gr | R | Gr | R |

⊙⋯Final Calculation Result of Each Region

DEVICE AND METHOD FOR MEASURING NOISE CHARACTERISTICS

CROSS-REFERENCE TO RELATED APPLICATIONS

This application is based upon and claims the benefit of priority from the prior Japanese Patent Application No. 2007-039706, filed on Feb. 20, 2007, the entire contents of which are incorporated herein by reference.

BACKGROUND OF THE INVENTION

1. Field

This disclosure relates to a device and a method for measuring noise characteristics of an imaging sensor.

2. Description of the Related Art

Recent imaging sensors have an increased pixel value. This has resulted in a tendency for the S/N ratio to being degraded. Pixel value represents a feature quantity (output value) for each pixel of an imaging sensor and is contained in the imaging data. For example, the pixel value may indicate concentration, brightness, luminance, color difference, intensity, or the like.

The noise contained in the imaging data is caused by various factors, and the pixel value Po of the imaging data can be expressed by equation (1), $$Po = Pt + Pn \qquad (1)$$

In equation (1), Pt represents a true pixel value and Pn represents noise.

Figure 7:
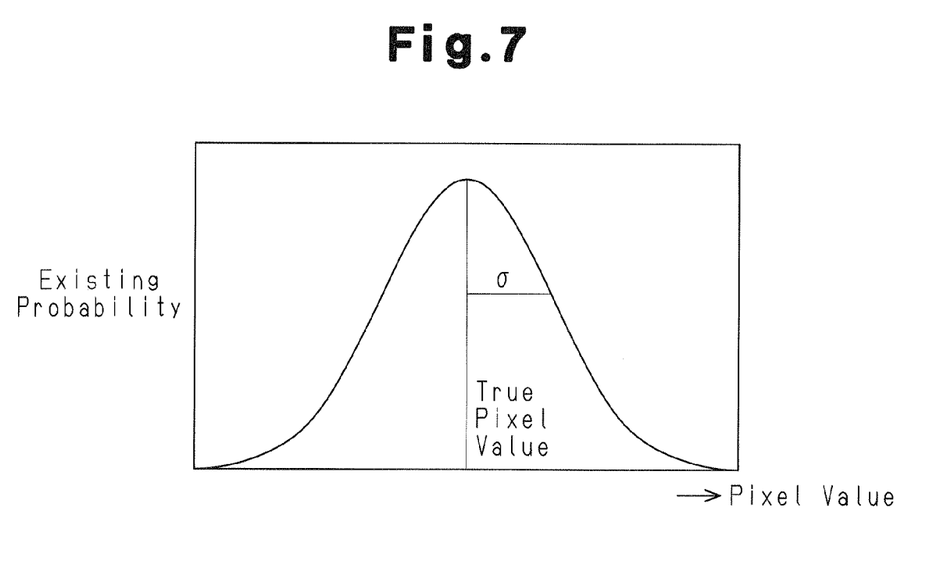
FIG. 7 is a graph showing the distribution of typical noise.

It is generally known that the distribution of noise Pn can be approximated as normal distribution. FIG. 7 shows the distribution of the pixel value Po. The pixel value Po is dispersed at a standard deviation $\sigma$ from the true pixel value Pt due to noise Pn.

Figure 8:
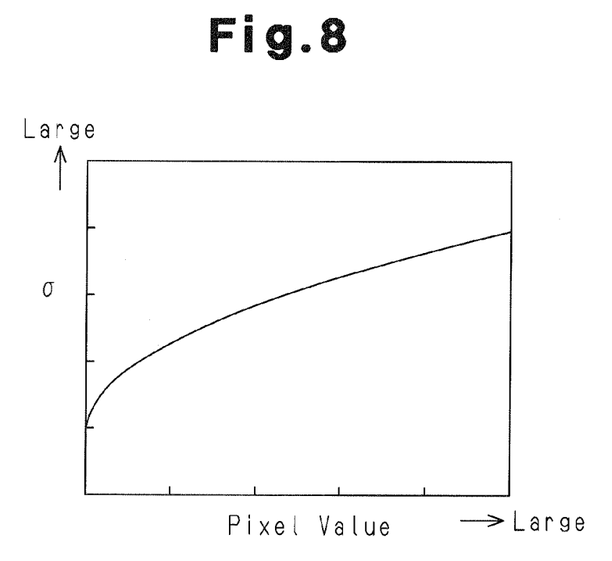
FIG. 8 is a noise characteristics graph showing a typical relationship between the pixel values and dispersion.

The standard deviation $\sigma$ (or deviation or dispersion) of the noise Pn in equation (1) is dependent on the true pixel value Pt. As shown in FIG. 8, the standard deviation $\sigma$ increases as the true pixel value Pt increases, and the noise Pn increases as the true pixel value Pt increases.

Figure 9:
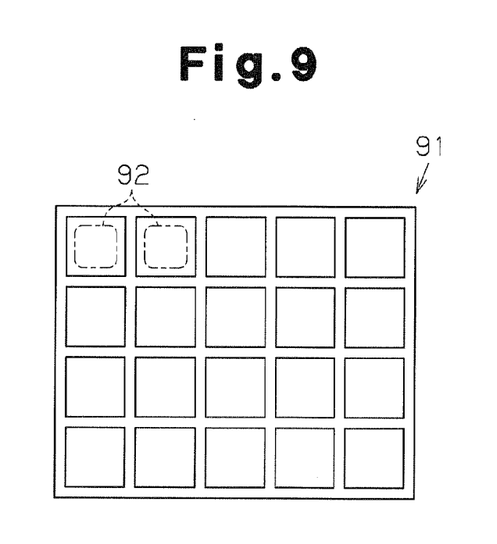
FIG. 9 is a schematic diagram showing a typical Macbeth chart.

The noise characteristics of the imaging sensor used in a digital camera are generally measured in the following manner. An imaging subject such as a Macbeth chart 91, which includes a plurality of color samples as shown in FIG. 9, is first prepared. Each color sample must have a flat portion 92 (monotone portion that does not include changes). Then, the Macbeth chart 91 is imaged with a digital camera (or prototype) that incorporates the imaging sensor that is subject to the measurement. From the obtained imaging data, partial image data corresponding to each flat portion 92 of the color sample is retrieved. The average value and deviation value of pixel values is then calculated for the retrieved partial image data corresponding to each color sample. In this manner, the noise characteristics of the imaging sensor are obtained.

There is a necessity to prepare and image the imaging subject (Macbeth chart 91) that includes a plurality of color samples, each having the flat portion 92. This is burdensome in that many tasks are necessary.

Presently, there are no means for obtaining the noise characteristics that reflect the level of the pixel value from the imaging result of an arbitrary imaging subject without using a color sample. Further, the noise characteristics cannot be obtained at the same time as when imaging an arbitrary imaging subject.

Japanese Laid-Open Patent Publication No. 63-253481 proposes a scheme for measuring noise characteristics by determining the average value of pixel values and the dispersion of circuit pixel values. The publication also proposes a scheme for determining Gauss data noise dispersion or image noise dispersion.

Japanese Laid-Open Patent Publication No. 2003-85553 proposes a noise characteristic measurement circuit that divides a pixel region of an imaging sensor into a plurality of small regions and outputs the average value and dispersion of the pixel values for each small region. Japanese Laid-Open Patent Publication No. 2003-85553 proposes the use of various values generated from such average value and dispersion.

SUMMARY

According to one aspect of the embodiments of the present invention, a noise characteristics measurement device for measuring noise characteristics of an imaging sensor, which comprises: a classification circuit including a plurality of pixel value regions obtained by dividing a numerical range that can be taken by pixel values of the imaging sensor in accordance with the level of a pixel value, the classification circuit classifying pixel values of imaging data generated by the imaging sensor into the plurality of pixel value regions; and a calculation circuit which calculates a value representing a dispersion degree of the pixel values classified into the pixel value regions for each of the pixel value regions, is provided.

BRIEF DESCRIPTION OF THE DRAWINGS

The embodiment, together with objects and advantages thereof, may best be understood by reference to the following description of the presently preferred embodiments together with the accompanying drawings in which.

DETAILED DESCRIPTION OF THE PREFERRED EMBODIMENTS

A digital camera according to one embodiment of the present invention will now be discussed.

Figure 1:
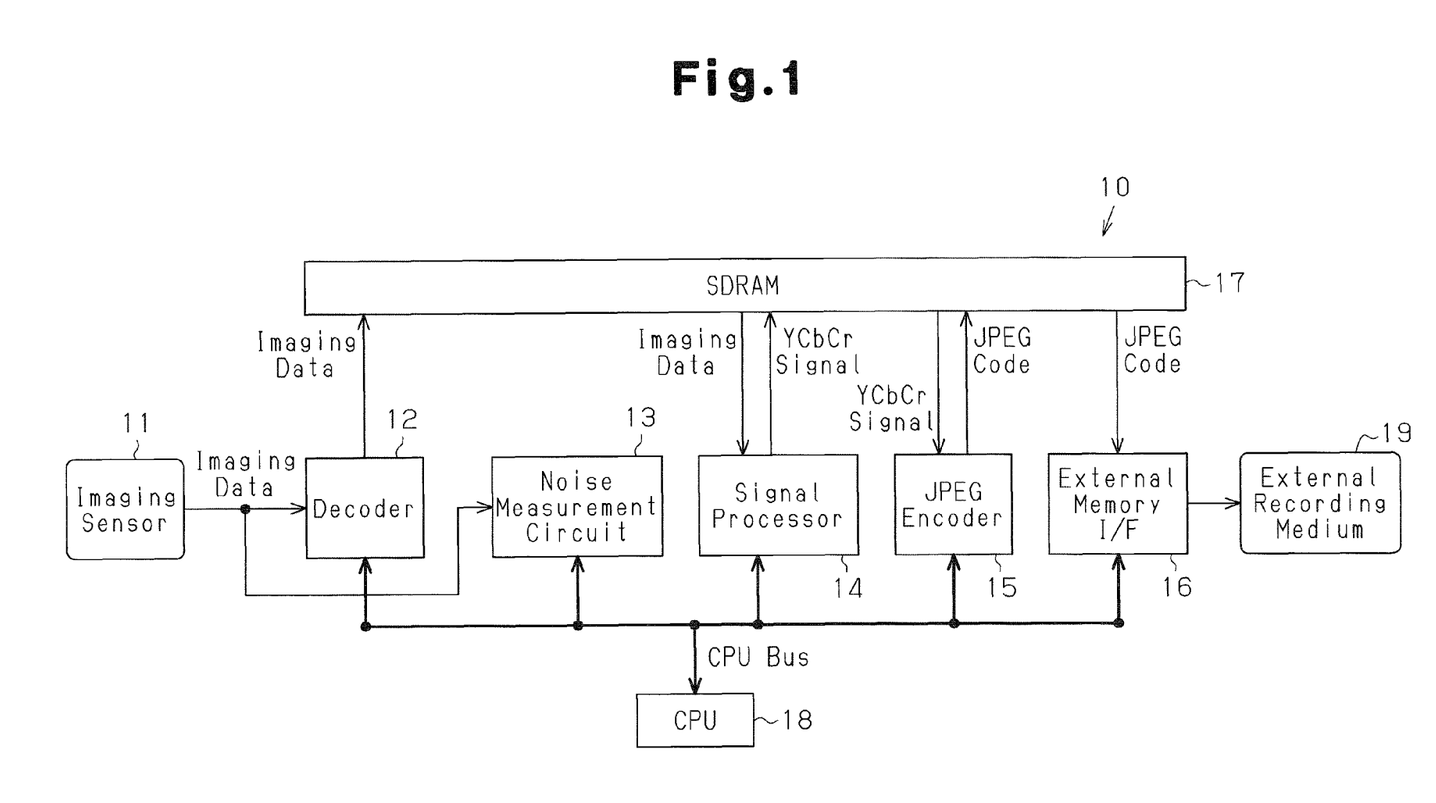
FIG. 1 is a block diagram of a digital camera according to one embodiment.

As shown in FIG. 1, a digital camera 10 includes an imaging sensor 11, a decoder 12, a noise measurement circuit 13, a signal processor 14, a Joint Photographic Experts Group (JPEG) encoder 15, an external memory interface (I/F) 16, a synchronous DRAM (SDRAM) 17, a CPU 18, and an external recording medium 19. The external recording medium 19 may be a portable memory card such as compact flash (CF) and SD memory.

The imaging sensor 11 is formed by, for example, a CCD image sensor or a CMOS image sensor, and has a two-dimensional pixel array with a plurality of pixels arranged in horizontal and vertical directions. Each pixel of the imaging sensor 11 converts the light from an imaging subject entering through an optical lens into an electrical signal. An (analog-to-digital) A/D converter (not shown) converts the electrical signal to a digital signal and generates imaging data. The imaging sensor 11 provides the generated imaging data to both the decoder 12 and the noise measurement circuit 13. The decoder 12 stores the imaging data in the SDRAM 17.

In the imaging sensor 11, the series of electrical signals generated by the series of pixels along each horizontal line are sequentially transferred in the vertical direction. Then, the series of electrical signals reaching the terminating end in the vertical direction are sequentially transferred in the horizontal direction. In this manner, the imaging data for an entire image (one frame) is output from the imaging sensor 11. In one example, the plurality of pixels of the imaging sensor 11 are arranged in a Bayer array corresponding to an RGB Bayer array filter. The imaging sensor 11 generates and outputs the imaging data as Bayer data. In this case, each pixel value contained in the imaging data is associated with one of the colors of red, green, and blue (RGB).

The decoder 12 generates an evaluation value for the entire image from the imaging data.

The noise measurement circuit 13 measures the noise characteristics of the imaging sensor 11 by processing the imaging data provided from the imaging sensor 11.

The signal processor 14 reads imaging data from the SDRAM 17, converts the imaging data, which is a Bayer array, to generate a YCbCr signal, and stores the YCbCr signal in the SDRAM 17. When generating the YCbCr signal, the signal processor 14 may also perform resolution conversion or various filtering processes such as noise reduction, edge enhancement, and color conversion, in accordance with set image processing parameters.

The JPEG encoder 15 reads the YCbCr signal from the SDRAM 17, converts the YCbCr signal to a JPEG code, and stores the JPEG code in the SDRAM 17.

The external memory I/F 16 is connectable to the external recording medium 19. The JPEG code stored in the SDRAM 17 is provided to the external recording medium 19 via the external memory I/F 16.

The CPU 18 is electrically connected to the decoder 12, the noise measurement circuit 13, the signal processor 14, the JPEG encoder 15, and the external memory I/F 16 through a CPU bus to control the operations thereof. The CPU 18 may read the noise characteristics measured by the noise measurement circuit 13 through the CPU bus, determine image processing parameters for the signal processor 14 based on the noise characteristics, and set the image processing parameters in the signal processor 14.

The configuration of the noise measurement circuit 13 will now be described with reference to FIG. 2.

Figure 2:
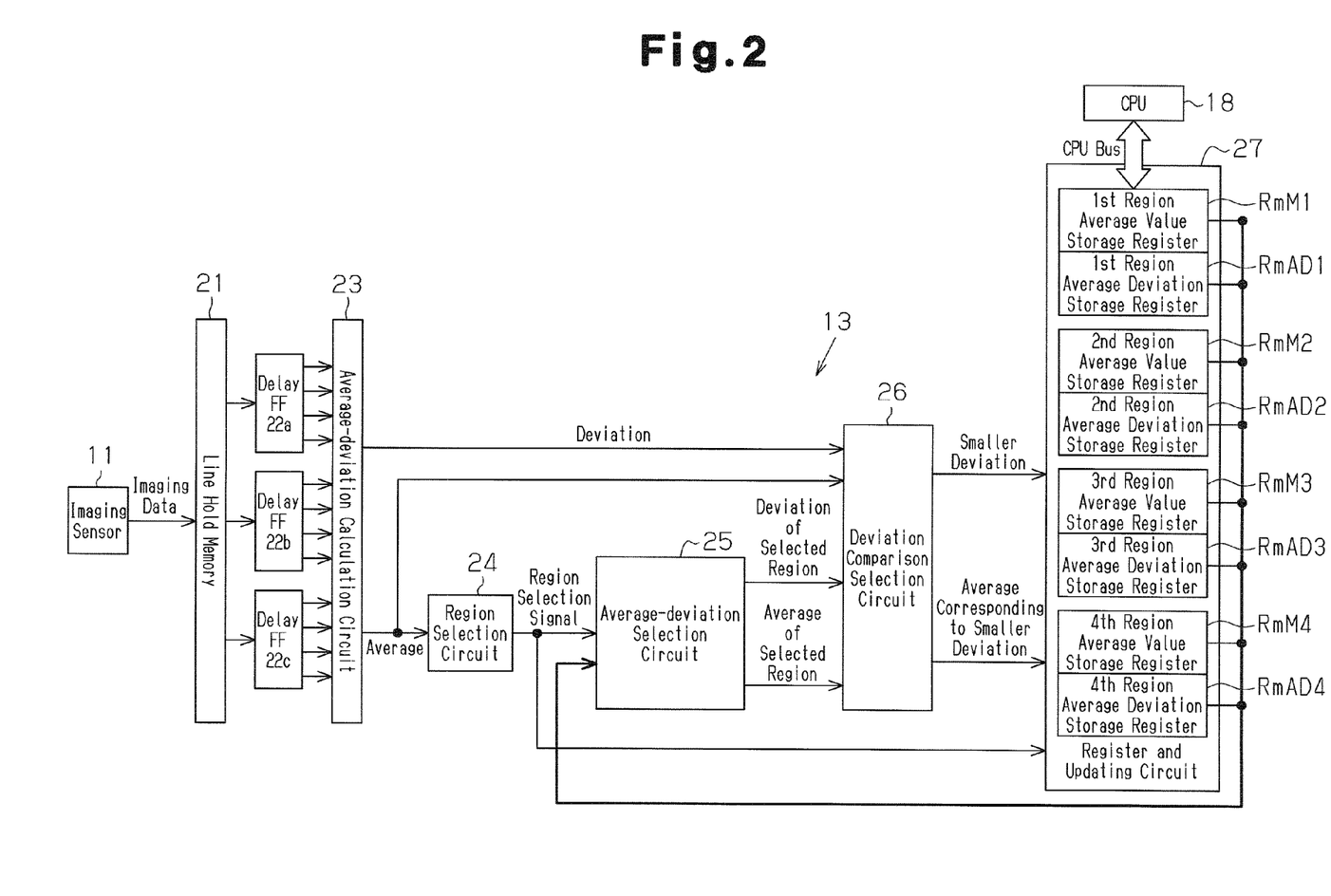
FIG. 2 is a block diagram of a noise measurement circuit according to one embodiment.

As shown in FIG. 2, the noise measurement circuit 13 includes a line hold memory 21 for storing the imaging data provided from the imaging sensor 11, a plurality of (e.g., three) delay FF units 22a, 22b, and 22c, an average-deviation calculation circuit 23, a region selection circuit 24, an average-deviation selection circuit 25, a deviation comparison selection circuit 26, and a register-updating circuit 27. The average-deviation calculation circuit 23 is an example of a calculation circuit, an average value calculation circuit, and a dispersion degree calculation circuit. The region selection circuit 24 is an example of a classification circuit. The register-updating circuit is an example of an updating circuit.

The line hold memory 21 receives pixel values of the pixels for the horizontal line that is presently output from the imaging sensor 11. In addition to the pixel values of the present line, the line hold memory 21 is capable of storing pixel values of the pixels for a plurality of lines (e.g., four lines) received immediately before the pixel values of the present line. In the illustrated example, the line hold memory 21 stores the pixel values for a total of five lines. From the stored pixel values for a plurality of lines, the line hold memory 21 provides the delay FF units 22a, 22b, and 22c with the pixel values of the pixels for a number of lines (three lines) corresponding to the number of the delay FF units 22a, 22b, and 22c.

Each of the delay FF units 22a, 22b, and 22c includes a flip-flop circuit (FF). The FF of each delay FF unit holds a plurality of cycles (e.g., eight cycles) of the pixels for the corresponding line provided from the line hold memory 21. Each of the delay FF units 22a, 22b, and 22c provides the average-deviation calculation circuit 23 with the pixel value of each pixel for a target color (e.g., R).

The relationship between the plurality of lines held by the line hold memory 21 and the pixels corresponding to the pixel values output from the delay FF units 22a, 22b, and 22c will now be discussed with reference to FIG. 3. The lines L1 to L5 indicate the plurality of lines (e.g., five lines) held by the line hold memory 21. The target color of each of the delay FF units 22a, 22b, and 22c is, for example, red (R). The line hold memory 21 provides the pixel values of the pixels for the lines L1, L3, and L5 to the delay FF units 22a, 22b, and 22c, respectively. In this case, each of the delay FF units 22a, 22b, and 22c holds a plurality of cycles (e.g., eight cycles) of the pixel values of the pixels for the corresponding one of the lines L1, L3, L5. The delay FF units 22a, 22b, and 22c provide the average-deviation calculation circuit 23 with the pixel values of the R pixels (in FIG. 3, the four encircled pixels for each line, total of twelve pixels).

Figure 3:
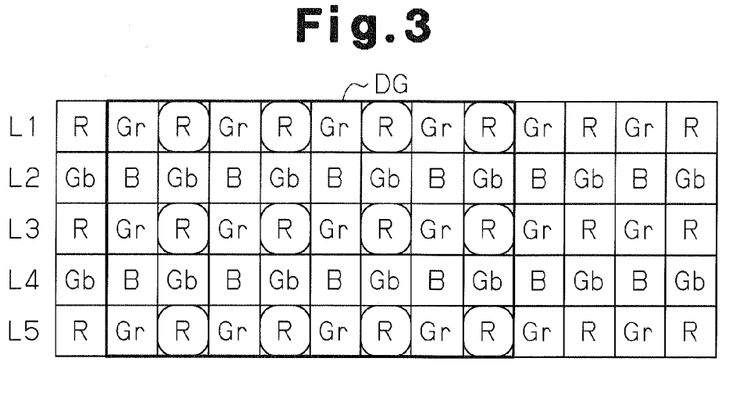
FIG. 3 is a schematic diagram showing an image region according to one embodiment.

In FIG. 3, the region in the portion of the two-dimensional array surrounded by a thick line and related to the outputs of the delay FF units 22a, 22b, and 22c form a single image region DG, which is one of a plurality of image regions obtained by dividing the imaging sensor 11 based on pixel positions. The delay FF units 22a, 22b, and 22c provide the average-deviation calculation circuit 23 with the pixel values of the target pixels (R) in the image region DG.

The pixel values for the plurality of lines held by the line hold memory 21 and the plurality of cycles held by the delay FF units 22a, 22b, and 22c are sequentially switched (updated) to sequentially form a plurality of image regions DG. Further, the pixel values of the target color in each image region DG are sequentially provided to the average-deviation calculation circuit 23.

The average-deviation calculation circuit 23 receives the pixel values (in the example of FIG. 3, the pixel values of twelve red pixels) for the pixels of the same color in each image region DG from the delay FF units 22a, 22b, and 22c. Then, the average-deviation calculation circuit 23 calculates the average value of the received pixel values and the average deviation, which is a value representing the dispersion degree of the received pixel values. These calculations may be referred to as an average value calculation step and a dispersion degree calculation step. Specifically, the average-deviation calculation circuit 23 calculates an average value Mx and an average deviation ADevx of the pixel value xj (j=1 to N) in accordance with the following equations (2) and (3), where N (12) represents the number of pixels of the same color (number of samples) in each image region DG and xj (j=1 to N) represents the pixel value.

$$Mx = \frac{1}{N}\sum_{j=1}^{N} x_j \qquad (2)$$

$$ADevx = \frac{1}{N-1}\sum_{j=1}^{N} |x_j - Mx| \qquad (3)$$

The average-deviation calculation circuit 23 provides the region selection circuit 24 and the deviation comparison selection circuit 26 with the calculated average value Mx and the deviation comparison selection circuit 26 with the calculated average deviation ADevx.

Figure 4:
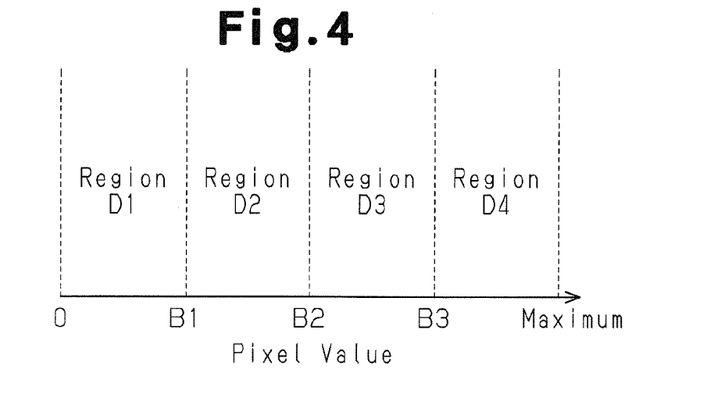
FIG. 4 is a schematic diagram showing a plurality of regions divided in accordance with the level of the pixel value.

The region selection circuit 24 includes a plurality of pixel value regions (e.g., D1, D2, D3, and D4 as shown in FIG. 4), which are obtained by dividing a numerical value range of the pixel values of the imaging sensor 11, in the form of a map or the like. The region selection circuit 24 determines which one of the pixel value regions the average value Mx received from the average-deviation calculation circuit 23 belongs to (classification step). Then, the region selection circuit 24 provides the average-deviation selection circuit 25 and the register-updating circuit 27 with a region selection signal indicating the determined or selected pixel value region.

The pixel value regions will now be described.

As shown in FIG. 4, the numerical value range that a pixel value of the imaging sensor 11 may take ranges from "0" to a predetermined maximum value. The range between "0" and the maximum value is divided into a plurality of (four) pixel value regions D1 to D4 at intervals determined by predetermined pixel values B1, B2, and B3, which are set in the given order from the side closer to "0". The region selection circuit 24 compares the average value Mx with each of the predetermined pixel values B1, B2, and B3 to determine which one of the pixel value regions D1 to D4 the average value Mx belongs to.

The register-updating circuit 27 includes first to fourth region average deviation storage registers RmAD1 to RmAD4, which respectively store minimum values mAD1 to mAD4 (later described) of the calculated average deviation ADevx, and corresponding first to fourth region average value storage registers RmM1 to RmM4, which respectively store average values mM1 to mM4 (later described). The minimum values mAD1 to mAD4 are respectively associated with the pixel value regions D1 to D4. The average values mM1 to mM4 are also respectively associated with the pixel value regions D1 to D4.

The average-deviation selection circuit 25 is connected to the first to fourth region average deviation storage registers RmAD1 to RmAD4 and the first to fourth region average value storage registers RmM1 to RmM4. The average-deviation selection circuit 25 reads and provides the deviation comparison selection circuit 26 with the minimum value mAD1, mAD2, mAD3, or mAD4 and the average value mM1, mM2, mM3, or mM4 from the corresponding storage registers that are associated with the pixel value region D1, D2, D3 or D4 designated by the region selection signal The deviation comparison selection circuit 26 compares the presently calculated average deviation ADevx from the average-deviation calculation circuit 23 with the minimum value mAD1 to mAD4 from the average-deviation selection circuit 25 obtained in the previous cycle. Then, the deviation comparison selection circuit 26 provides the register-updating circuit 27 with the smaller one of the values and an average value that is paired with the smaller one of the values. The register-updating circuit 27 stores the values provided from the deviation comparison selection circuit 26 as a new minimum value mAD1, mAD2, mAD3, or mAD4 and a new average value mM1, mM2, mM3, or mM4 in the first to fourth region average deviation storage register RmAD1, RmAD2, RmAD3, or RmAD4 and the first to fourth region average value storage register RmM1, RmM2, RmM3, or RmM4 respectively associated with the pixel value region D1, D2, D3, or D4 designated by the region selection signal from the region selection circuit 24. In this manner, the register-updating circuit 27 is updated (updating step). Accordingly, the first to fourth region average deviation storage registers RmAD1 to RmAD4 ultimately stores the average deviation ADevx that is minimal in each of the pixel value regions D1 to D4 of every one of the image regions DG. Furthermore, the first to fourth region average value storage registers RmM1 to RmM4 ultimately stores the average value Mx corresponding to the average deviation ADevx stored in each of the first to fourth region average deviation storage registers RmAD1 to RmAD4. The minimum values mAD1 to mAD4 may initially be set to a maximum value that can be taken as the average deviation ADevx.

Figure 5:
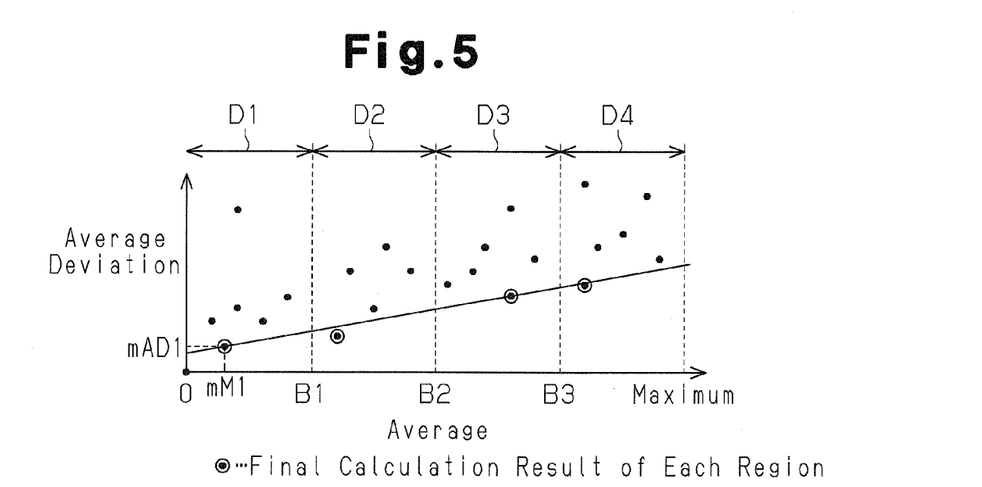
FIG. 5 is a graph showing an average deviation and an average value updated for every region.

The updating of the average deviation ADevx and the average value Mx for each of the pixel value regions D1 to D4 performed by the register-updating circuit 27 for all the image regions DG of the imaging sensor 11 will now be discussed with reference to FIG. 5. In accordance with the procedures described above, the calculation of the average deviation ADevx and the average value Mx and the updating of the registers corresponding to the selected pixel value regions D1 to D4 are repeated for all of the image regions DG. Consequently, as indicated by the encircled dots in FIG. 5, the average deviation ADevx (minimum value mAD1 to mAD4), which is constantly minimal, and the average value Mx (average value mM1 to mM4), which is paired with the average deviation ADevx, are sequentially updated in each of the pixel value regions D1 to D4. Ultimately, the average deviation ADevx of the image region DG that is minimal, or flattest, in all the image regions DG and the average value Mx (shown by encircled dot) paired with the average deviation ADevx are stored. The relationship between the final average deviation ADevx and the average value Mx can be expressed as a line (see FIG. 5) approximated through least squares method or the like. The approximated result indicates the relationship of the average deviation ADevx with respect to the pixel value, that is, the noise characteristics of the pixel value. The noise measurement circuit 13 thus measures the noise characteristics by obtaining the final average deviation ADevx and average value Mx of each pixel value region D1 to D4. The noise characteristics with respect to the pixel value may be obtained by approximating (e.g., polynomial approximation, triangular approximation, exponential approximation, power approximation, logarithmic approximation, etc.) the final average deviation ADevx and the average value Mx with an appropriate curve.

The CPU 18 reads through the CPU bus the average deviations ADevx and the average values Mx ultimately stored in the plurality of registers of the register-updating circuit 27, or the noise characteristics measured by the noise measurement circuit 13, and uses the read average deviations ADevx and the average values Mx to control the operation of the signal processor 14.

The above described and illustrated embodiment has the advantages described below.

(1) The register-updating circuit 27 updates each of the pixel value regions D1 to D4, which are divided in accordance with the level of pixel values, with a smaller average deviation ADevx and corresponding average value Mx. The minimum value mAD1 to mAD4 of the average deviation ADevx and the corresponding average value mM1 to mM4 stored in the register-updating circuit 27 are ultimately acquired. Accordingly, for each of the pixel value regions D1 to D4, the relationship of the average value Mx and average deviation ADevx of the pixel values, that is, the noise characteristics of the imaging sensor 11 reflecting the level of the pixel value, is easily obtained for the flattest image region DG, that is, the image region DG in which the average deviation ADevx takes a minimum value mAD1 to mAD4.

By using the noise characteristics obtained in such a manner, the signal processor 14 can perform sophisticated noise reduction with high accuracy.

(2) The relationship of the average value Mx and the average deviation ADevx of pixel values, that is, the noise characteristics of the imaging sensor 11 reflecting the level of the pixel value, is obtained for each pixel of the same color in the Bayer array of the imaging sensor 11.

(3) The calculation of the average value Mx of the pixel values in the image region DG uses the pixel value of the pixel position region (e.g., designated two-dimensional range in the pixel array) extending in the horizontal direction and the vertical direction of the imaging sensor 11. Thus, the degree of freedom for setting the image region DG is high. Accordingly, the calculation of the average value Mx in the designated image region DG and the measurement of the noise characteristics can be performed.

(4) The digital camera 10, which is a final product, may be used to obtain the noise characteristics of imaging data that are obtained at the same time as when an image is captured. Thus, the image processing parameters corresponding to the obtained noise characteristics may be dynamically set in the signal processor 14. As a result, the optimum image processing parameters can be constantly applied, and a final image of higher quality can be obtained.

(5) During the development of firmware for the digital camera 10, the noise characteristics are easily obtained without performing burdensome tasks. For example, by the noise characteristics may be measured for each representative imaging condition, such as ISO sensitivity, exposure time, or the like using a prototype of the digital camera 10 to predict the noise quantity for each imaging condition. This enables the selection of optimum image processing parameters for each imaging condition with firmware.

(6) Further, during the development of hardware for the digital camera 10, the noise characteristics are easily obtained. Thus, the obtained noise characteristics can be used effectively for taking measures to counter noise such as changing a circuit board layout. For example, when developing the substrate for the digital camera 10, plural types of prototype hardware (boards) are prepared and the noise characteristics are measured under the same imaging conditions. This enables the development of a digital camera 10 having less noise due to an improved circuit board layout.

It should be apparent to those skilled in the art that the present invention may be embodied in many other specific forms without departing from the spirit or scope of the invention. Particularly, it should be understood that the present invention may be embodied in the following forms.

The dispersion (unbiased dispersion) calculated in accordance with the following equation (4) may be used as a value representing the dispersion degree.

$$\sigma^2 = \frac{1}{N-1} \sum_{j=1}^{N} (x_j - Mx)^2 \quad (4)$$

The standard deviation calculated in accordance with the following equation (5) may be used as a value representing the dispersion degree.

$$\sigma = \sqrt{\frac{1}{N-1} \sum_{j=1}^{N} (x_j - Mx)^2} \quad (5)$$

The average deviation, dispersion (sample dispersion), or standard deviation obtained by replacing (N−1) in equations (3), (4), and (5) with N may be used as the value representing the dispersion degree. If the number of pixels (number of samples during calculation of the average value Mx) in each image region DG is constant, the value taken before the division with (N−1) in equations (3), (4), and (5) may be used.

An appropriate value using the difference between the sample value (xj) and the average value (Mx) may be used as the value representing the dispersion degree.

The range of the image region DG for the calculation of the average value Mx may be changed. In this case, if the number of pixels (number of samples for calculation of the average value Mx) in the image region DG remains the same, by setting the range of the image region DG to be long in the horizontal direction (in the output direction of the imaging data), the capacity of the line hold memory 21 can be reduced compared to when the range is set so as to have a generally square shape.

Figure 6:
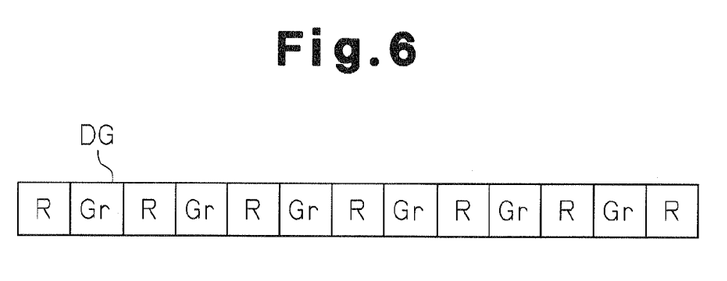
FIG. 6 is a schematic diagram showing an image region according to a modified embodiment.

As shown in FIG. 6, the image region DG related to the calculation of the average value Mx may be set to a pixel position region (e.g., a one-dimensional range designated in the pixel array) extending in the horizontal direction of the imaging sensor 11. In this case, calculation of the average value Mx can be performed in correspondence with the horizontal transfer of signals indicating the pixel values of the imaging sensor 11. Thus, the pixel values for a plurality of lines in the vertical direction of the imaging sensor 11 does not need to be stored or held, and the configuration can be simplified by omitting the line hold memory 21.

The number of pixels (number of samples for calculation of the average value Mx) in the image region DG related to the calculation of the average value Mx may be changed. However, it is preferred that the number of pixels (pixels of the same color) be greater than or equal to ten from statistical aspects.

In the described and illustrated embodiment, the average value Mx of the pixel values of each image region DG is classified into pixel value regions D1 to D4. Instead, the pixel values may be classified to the pixel value regions D1 to D4 irrespective of the presence of the image region DG. In this case, the value (average deviation etc.) representing the dispersion degree is calculated from all of the pixel values belonging to the pixel value regions D1 to D4 in each divided pixel value region D1 to D4. Even if changed in such a manner, the relationship between the pixel values and the value representing the dispersion degree of the pixel values in the pixel value region D1 to D4, that is, the noise characteristics of the imaging sensor 11 reflecting the level of the pixel value can be easily obtained. The level of the pixel value correlated with the noise characteristics of the imaging sensor 11 may be the average value of all the pixel values belonging to each pixel value region D1 to D4, the upper limit value or the lower limit value (0, BE1, B2, and B3, maximum value) of the pixel values defining the pixel value regions D1 to D4, the intermediate value (average value) of such. upper limit value and lower limit value, or the like.

The number of pixel value regions may be changed to a number other than four such as eight or sixteen.

The noise characteristics may be acquired by calculating the value representing the dispersion degree based on the YCbCr signal for each pixel of the imaging sensor 11.

The imaging sensor 11 may be a monochrome image sensor without an RGB filter.

Examples of pixel values used to acquire the noise characteristics include concentration, brightness, luminance, color difference, and intensity.

The present invention may be applied to other image recording devices (including prototypes) incorporating the imaging sensor 11, such as an image scanner and a facsimile. The present invention may be applied to an evaluation board used to develop various image recording devices with less noise.

The present examples and embodiments are to be considered as illustrative and not restrictive, and the invention is not to be limited to the details given herein, but may be modified within the scope and equivalence of the appended claims.

What is claimed is:

1. A noise characteristics measurement device for measuring noise characteristics of an imaging sensor, the noise characteristics measurement device comprising:
   a classification circuit including a plurality of pixel value regions obtained by dividing a numerical range that can be taken by pixel values of the imaging sensor in accordance with the level of a pixel value, the classification circuit classifying pixel values of imaging data generated by the imaging sensor into the plurality of pixel value regions; and
   a calculation circuit which calculates a value representing a dispersion degree of the pixel values classified into the pixel value regions for each of the pixel value regions.

2. The noise characteristics measurement device according to claim 1, wherein a plurality of pixels of the imaging sensor are dividable into a plurality of image regions in accordance with a designated pixel position, the noise characteristics measurement device further comprising:
   an average value calculation circuit for calculating an average value of the pixel values of the pixels in each image region,
   wherein the classification circuit classifies the calculated average value into the plurality of pixel value regions,
   wherein the calculation circuit calculates the value representing the dispersion degree of the pixel values in the image regions for each image region, and
   wherein the noise characteristics measurement device sets a minimum value for the values representing the dispersion degree respectively associated with the average values classified into the pixel value regions as a value representing a final dispersion degree of the pixel values of each pixel value region.

3. The noise characteristics measurement device according to claim 2, wherein the imaging sensor includes Bayer array pixels, wherein the average value calculation circuit calculates the average value of the pixel values for pixels of the same color in the Bayer array pixels, and wherein the calculation circuit calculates the dispersion degree of the pixel values of the pixels of the same color in the Bayer array pixels.

4. The noise characteristics measurement device according to claim 2, wherein the image region is a pixel position region extending in a horizontal direction of the imaging sensor.

5. The noise characteristics measurement device according to claim 2, wherein the image region is a pixel position region extending in a horizontal direction and a vertical direction of the imaging sensor.

6. A noise measurement device for measuring noise characteristics of an imaging sensor that is dividable into a plurality of image regions in accordance with a designated pixel position, the noise characteristics measurement device comprising:
   an average value calculation circuit which calculates an average value of pixel values of pixels in each image region;
   a dispersion degree calculation circuit for calculating a value representing a dispersion degree of the pixel values in each image region;
   a classification circuit including a plurality of pixel value regions obtained by dividing a numerical range that can be taken by pixel values of the imaging sensor in accordance with the level of a pixel value, the classification circuit classifying the calculated average value and the value representing the dispersion degree and corresponding to the average value into the pixel value regions; and
   an updating circuit for updating the value representing the dispersion degree and the average value corresponding to the value representing the dispersion degree so that the calculated value representing the dispersion degree becomes smaller for each divided region.

7. The noise characteristics measurement device according to claim 6, wherein the value representing the dispersion degree of the pixel values for each pixel value region is initially a maximum value that can be taken by the value representing the dispersion degree.

8. A method for measuring noise characteristics of an imaging sensor that is dividable into a plurality of image regions in accordance with a designated pixel position; the method comprising:
   calculating an average value of pixel values of pixels in each image region;
   calculating a value representing a dispersion degree of the pixel values in each image region;
   setting a plurality of pixel value regions obtained by dividing a numerical range that can be taken by pixel values of the imaging sensor;
   classifying the calculated average value and the value representing the dispersion degree and corresponding to the average value into the pixel value regions; and
   updating the value representing the dispersion degree and the average value corresponding to the value representing the dispersion degree so that the calculated value representing the dispersion degree becomes smaller in each divided region.

* * * * *